United States Patent [19]
Fukuda

[11] 3,793,877
[45] Feb. 26, 1974

[54] AIR LEAKAGE DETECTOR, USING A DIRECT PRESSURE SYSTEM

[76] Inventor: Akira Fukuda, 2-22-8, Kasuga-cho, Nerima-ku, Tokyo, Japan

[22] Filed: May 5, 1972

[21] Appl. No.: 250,752

Related U.S. Application Data

[63] Continuation-in-part of Ser. No. 250,751, May 5, 1972.

[30] Foreign Application Priority Data
Nov. 12, 1971  Japan.............................. 46-105636

[52] U.S. Cl. ............................................... 73/49.3
[51] Int. Cl. ............................................ G01m 3/02
[58] Field of Search ......... 73/40, 41, 45, 45.1, 45.2, 73/45.9, 49.2, 49.3, 52, 149

[56] References Cited
UNITED STATES PATENTS

| | | | |
|---|---|---|---|
| 2,924,965 | 2/1960 | Westerheim | 73/40 |
| 3,028,750 | 4/1962 | Rondeau | 73/40 |
| 3,504,528 | 4/1970 | Weinberg | 73/49.3 |
| 3,355,932 | 12/1967 | Mulligan | 73/49.3 |

*Primary Examiner*—S. Clement Swisher

[57] ABSTRACT

An object to be tested and a comparison object are placed in separate receptacles, the receptacles pressurized, isolated, and their pressure differential measured to detect small leaks in the test object. In order to determine larger leaks, a second pair of receptacles are provided which are later placed in communication with the first pair so that larger leaks may be detected. This application provides an additional pair of valves so that all receptacles are maintained at substantially the same pressure during the check for small leaks. The result of this arrangement is that the effect of small leaks in the valves between the two sets of receptacles is nulified.

1 Claim, 4 Drawing Figures

AIR LEAKAGE DETECTOR, USING A DIRECT PRESSURE SYSTEM

This application is a continuation-in-part of may copending application Ser. No. 250,751 filed May 5, 1972.

DETAILED DESCRIPTION OF THE INVENTION

Figure 1:
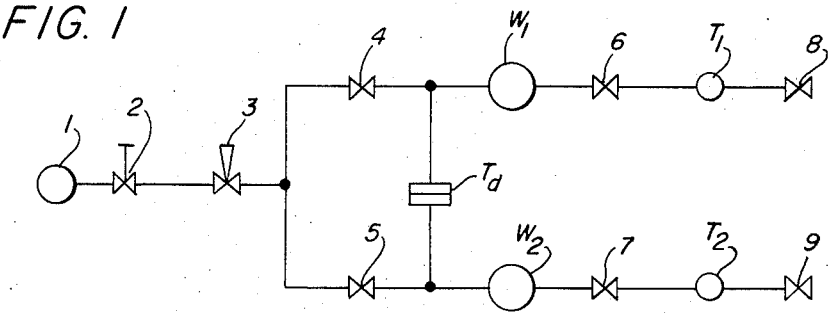
FIG. 1 is a theoretical diagram of the leakage detector in accordance with the principale of direct pressure which is the concern of the present invention.

The device shown in the drawing consists of a compressed air source 1, a decompression valve 2, a three-directional valve 3, electromagnetic valves 4, 5, 6, 7, 8, and 9, an air-tight receptacle for contaiming the object to be tested for leakage W1, an air-tight receptacle for holding the reference object W2, and two containers T1 and T2, smaller in size than the airtight receptacles W1 and W2. The transducer for detecting the pressure differential is labeled T$d$. The receptacles W1 and W2 as well as the containers T1 and T2 shall respectively be of the same volume.

Figure 2:
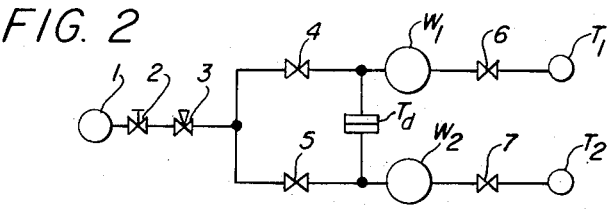
FIG. 2 shows a detector which was the subject of application Ser. No. 250,751.

Regarding the operation of the device in detecting leakage in the test object of FIG. 2, it is identical with that of the inventor's preceding application, whose functioning is recalled here :

After air pressur frome the compressed air source 1 is reduced to the desired pressure by the decompression valve 2, valves 6 and 7 are closed, after which the air-tight receptacles W1 and W2 are supplied with compressed air by opening valves 3, 4, and 5.

In the event of a very small leak, an extremely small pressure differential will be produced on the conduits between the two receptacles, and it will be possible to detect this leak with the aid of the transducer T$d$.

Should it be necessary to measure a larger leak, compressed air is supplied to the two air-tight receptacles in the same manner it is supplied in the preceding case of detection of the extremely small leak. The valves 6 and 7 are then opened in order to connect the two receptacles to the containers T1 and T2 after closing valves 4 and 5.

Consider just the two air-tight receptacles W1 and W2. The air pressure in the two receptacles may be the same , but if there is a large leak in the test object contained in the receptacle W1, the quantity of air supplied to each receptacle will be different. This is because air leaking through a large leak will pressurize the interior of the test object before the valves 4 and 5 can be closed In conclusion, if air is passed from the receptacles W1 and W2 into the containers T1 and T2, a pressure differential is produced on the conduits, making is possible to detect a large leak with the aid of the transducer T$d$.

Figure 3A:
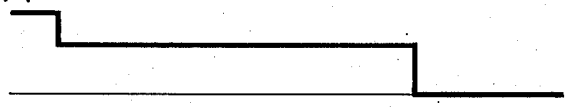
FIG. 3A is a diagram of the air pressure along the flow conduits.

Following the theoretical diagram shown in FIG. 3A, closing valves 6 and 7, which are repsectively connected with the air-tight receptacles W1 and W2 and the containers T1 and T2, produces a pressure differential between the above-cited valves which gives rise to an extremely small leak due to the functioning of the valves themselves. The presence of this leak in valves 6 and 7 interferes with the accuracy of the measurements taken on the test object, and affects the final results.

Figure 3B:
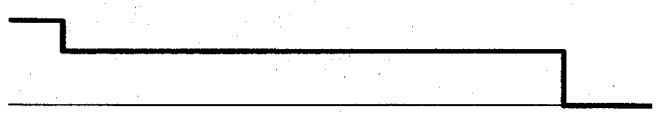
FIG. 3B is a diagram of the air pressure along the flow conduits of the leakage detector which is the object of the present invention.

The purpose of this invention is thus to eliminate this defect, and, as is illustrated in FIG. 1, the electromagnetic valves 8 and 9 have been added to assure that valves 4 and 5 as well as 6 and 7, located on both sides of the leak detection mechanisms W1 and W2, remain at the same pressure and do not suffer any leakage. In the present invention, as described in FIG. 3B, the air pressure, reduced to the desired pressure level by the decompression valve, is always at the same pressure when it arrives at valves 8 and 9 at the extremities of the two conduits. And this derives from the fact that the pressure in valves 6 and 7, situated respectively between the air-tight receptacles W1 and W2 and the containers T1 and T2, remains constant even when they are closed. The functioning of the leakage detector on this conduit structure is the same as the one illustrated in FIG. 2. Nevertheless, the operational stages of the device will be described in detail below.

Initially, the air pressure emanating from the air source is reduced to the desired air pressure by the decompression valve, after which valves 8 and 9 are closed. Following this, valves3, 4, 5, 6, and 7 are opened, and finally the receptacles containing the test objects W1 and W2 as well as the containers T1 and T2 are supplied with compressed air. Valves 6, 7, 4, and 5 are then closed. As there is no difference in the pressure of the compressed air between the two flow conduits even after closing these valves, there is never any leakage produced at all, since there is no air leak in the valves enclosing the two containers W1 and W2. It then becomes possible to accurately measure the extremely small leaks occurring within the interior of the air-tight receptacles containing the test objects with the aid of a transducer T$d$. Measurement of big leaks.

In this event, valves 8 and 9 are opened, the pressure in the containers T1 and T2 is reduced, and then the valves are closed. Next, valves 6 and 7 are opened, and compressed air is passed from W1 and W2 to T1 and T2, making it possible to measure leakage of a more consequential nature, as illustrated in FIG. 2.

When measuring extremely small leaks, closing of the valves 6 and 7 on the flow conduits(see FIG. 2) should theoretically not produce a leak of compressed air along the detection conduits provided there is no air escaping in the containers T1 and T2. In fact, however, small leaks will become apparent as the device continues to be used.

The present invention, as has been described in the above, makes possible the measurement of significant leaks of air (as, for example, when checking for the presence of air leakage in watches and timepieces), following the measurement of small leaks. In actual practice, testing for extremely small leaks is for more common than checking for leakage of a fairly significant dimension.

Inasmuch as it is possible to close and open the valves which are located on the distribution conduits alternately with the components of the apparatus in such a way that they operate at a constant pressure, it becomes possible to avoid any leakage whatever, including the tiniest leaks, from the valves. It is this factor therefore that provides the present device with its characteristic precision in measuring leakage in test objects.

I claim

1. In a leakage detector having a source of air pressure other than atmospheric, a pressure regualting valve and a cut-off valve connected in series to the air source, a conduit including two parallel branches connected to the first cut-off valve, each conduit branch including a second cut-off valve, an airtight receptacle, a third cut-off valve and a container sequentially connected therein, and a differential pressure transducer for indicating the difference in pressure between the two receptacles, the two receptacles being of the same size and adapted to contain a test or reference piece and the two containers being the same size. The improvement comprising additional valve means connected to each of the containers for directly venting the pressure therein subsequent to the initial pressurization but prior to the large leak test.

* * * * *